United States Patent
Kalakodimi et al.

(10) Patent No.: US 10,214,459 B2
(45) Date of Patent: Feb. 26, 2019

(54) CORROSION CONTROL METHODS FOR CORROSION-AGRESSIVE SOLUTIONS

(71) Applicant: CHEMTREAT, INC., Glen Allen, VA (US)

(72) Inventors: Rajendra Prasad Kalakodimi, Glen Allen, VA (US); Joseph Clatterbuck, Mechanicsville, VA (US); Tzongyeu Du, Glen Allen, VA (US)

(73) Assignee: CHEMTREAT, INC., Glen Allen, VA (US)

( * ) Notice: Subject to any disclaimer, the term of this patent is extended or adjusted under 35 U.S.C. 154(b) by 210 days.

(21) Appl. No.: 15/208,367

(22) Filed: Jul. 12, 2016

(65) Prior Publication Data

US 2018/0016197 A1   Jan. 18, 2018

(51) Int. Cl.
*C05G 3/00* (2006.01)
*C05C 1/00* (2006.01)

(52) U.S. Cl.
CPC .................. *C05G 3/00* (2013.01); *C05C 1/00* (2013.01); *C05G 3/0076* (2013.01)

(58) Field of Classification Search
CPC ............ C05G 3/00; C05G 3/0076; C05C 1/00
See application file for complete search history.

(56) References Cited

U.S. PATENT DOCUMENTS

| | | | |
|---|---|---|---|
| 2009/0007616 A1* | 1/2009 | Bureman | C05C 1/00 71/30 |
| 2012/0282136 A1* | 11/2012 | Richardson | C23F 11/18 422/38 |
| 2013/0280124 A1* | 10/2013 | Bedinger, III | C10G 75/02 422/7 |

OTHER PUBLICATIONS

Puckorius, Paul R. "Proper Initial Passivation of Cooling Water Heat Exchangers—Is This a Lost Art?" International Water Conference, IWC-02-62.
NACE International. "Standard Recommended Practice—Initial Conditioning of Cooling Water Equipment." NACE Standard RP0182-95, Item No. 21027, revised Oct. 1995.
Department of Defense. Unified Facilities Criteria (UFC). "Industrial Water Treatment Operation and Maintenance." UFC 3-240-13FN, May 25, 2005.
ASTM International. "Standard Specification for Chemical Passivation Treatments for Stanless Steel Parts." Designation: A967/A967M-13, Jul. 30, 2015.

* cited by examiner

*Primary Examiner* — Peter F Godenschwager
*Assistant Examiner* — Andrew J. Oyer
(74) *Attorney, Agent, or Firm* — Oliff PLC

(57) ABSTRACT

Methods are described for preventing corrosion in a corrosion-aggressive media. The methods include combining a stannous corrosion inhibitor composition with a corrosion-aggressive media (such as a nitrogen-based solution, or more specifically a liquid solution of AN or UAN) to provide a treated solution. The stannous corrosion inhibitor composition may include a caustic. Also described is a liquid including from 0.1 wt % to 25 wt % of a stannous salt and from 1 wt % to 50 wt % of a caustic, and a liquid composition including a solution of urea ammonium nitrate and a stannous material. The liquid and stannous corrosion inhibitor compositions substantially prevent corrosion of a metal surface even when used in very small amounts and at a low pH.

21 Claims, 5 Drawing Sheets
(4 of 5 Drawing Sheet(s) Filed in Color)

CORROSION CONTROL METHODS FOR CORROSION-AGRESSIVE SOLUTIONS

BACKGROUND

The storage and transport of corrosive materials (sometimes referred to as "aggressive" materials) can lead to a variety of problems. The magnitude of these problems increases with the corrosiveness of the materials. Some aggressive substances produce a considerable amount of corrosion damage, requiring actual repair of the transport or storage container or conduit used to transport or store the substance.

Fertilizer solutions, such as nitrogen-based solutions, are very corrosive. Example nitrogen-based solutions include ammonia solutions, Ammonium Nitrate (AN), and urea ammonium nitrate (UAN). AN and UAN are commercially popular and are widely used in agricultural applications. But due to their extremely high corrosiveness, AN and UAN solutions are problematic to store and transport. Similar corrosiveness problems exist for storing and transporting a variety of materials.

The popularity of UAN is due in part to its relative ease of handling. For example, UAN has an extremely low critical relative humidity (the atmospheric humidity at which the solid product absorbs water from the atmosphere) of only 18% at 30° C. Thus, UAN is used as a liquid fertilizer, and does not need to be kept under pressure. As a liquid, it can be injected beneath the soil surface, dribbled onto the soil surface, added to irrigation water, or sprayed onto plant leaves and/or the soil surface at controlled application rates. In addition, it can be easily mixed with herbicides, pesticides, micronutrients, or other liquid fertilizers, allowing for one-pass application. This substantially reduces the time and cost required to apply these components to a crop.

AN and UAN deliver a high concentration of both fast- and slow-release nitrogen nutrients. The nitrate ($NO_3^-$) portion of these fertilizers (typically accounting for about 25% of the total nitrogen content in UAN) is immediately available for plant uptake. The ammonium ($NH_4^+$) portion (typically about another 25% of the total nitrogen content in UAN) may be assimilated directly by some plants, but is also rapidly oxidized by soil bacteria to form nitrate. Soil enzymes hydrolyze the remaining urea portion (typically about 50% of the total nitrogen content in UAN) to form ammonium, which is subsequently transformed into more nitrate in the soil. Thus, the nitrogen nutrients can either be immediately absorbed by the plants, or absorbed more gradually through the soil.

AN and UAN fertilizers are also simple to produce. To produce UAN, for example, a heated solution containing dissolved urea is mixed with a heated solution of ammonium nitrate to create a clear solution of urea ammonium nitrate. UAN can either be made in a batch or continuous process. No emissions or waste products are produced during mixing.

Because AN and UAN are concentrated nitrogen solutions, their solubility decreases as temperature decreases. To prevent the nitrogen components from precipitating as crystals, manufacturers dilute the solutions in geographic regions that may experience colder seasonal climates. UAN, for example, is typically manufactured with about 20 wt % water, and is generally further diluted for field applications to about 28 wt % water. An may be diluted with, for example, 30 wt % to 50 wt % water.

AN solutions generally can include a total nitrogen content in the range of from 10% to 50%, and can include from 50 wt % to 100 wt % of ammonium nitrate, and from 0 wt % to 50 wt % of water. More typically, AN solutions can include from 15% to 40% nitrogen, or from 20% to 35% nitrogen; from 40 wt % to 80 wt %, or from 50 wt % to 70 wt % of ammonium nitrate; and from 20 wt % to 60 wt %, or from 30 wt % to 50 wt % of water. For example, AN 20 (also known as AN 20-0-0) typically has about 50 wt % to 70 wt % ammonium nitrate, and about 30 wt % to 50 wt % water. Its total nitrogen content is about 20%. By comparison, the total nitrogen content of AN 34 is about 34%. Other concentrations may also be used.

UAN solutions generally can include a total nitrogen content in the range of from 10% to 50%, and can include from 20 wt % to 80 wt % of each of ammonium nitrate and urea, and from 0 wt % to 50 wt % of water. More typically, UAN solutions can include from 15% to 40% nitrogen, or from 20% to 35% nitrogen; from 25 wt % to 60 wt %, or from 30 wt % to 45 wt % of each of ammonium nitrate and urea; and from 10 wt % to 40 wt %, or from 20 wt % to 30 wt % of water. For example, UAN 32 (also known as UN32, UN-32, or UAN 32.0.0) typically has about 45 wt % ammonium nitrate, about 35 wt % urea, and about 20 wt % water. Its total nitrogen content is about 32%. UAN 28 typically has about 39 wt % ammonium nitrate, about 31 wt % urea, and about 30 wt % water, and its total nitrogen content is about 28%. Other concentrations may also be used, such as UAN 18 or UAN 30.

Despite its advantages, a major downside of both AN and UAN is that they are highly corrosive to storage tanks, pumps, pipes, rail cars, barges, tank trucks, and agricultural application equipment. UAN is particularly corrosive toward mild steel (that is, low-carbon steel having approximately 0.05%-0.25% carbon), which is commonly used in such applications. For example, UAN can lead to corrosion of up to 500 mils penetration per year (MPY) on C1010 steel. UAN solutions are acidic, with a pH of typically 6.0 or lower. The pH of UAN solutions will drift even lower as any buffering agents added to the solution are volatilized. Traditional corrosion inhibitors are ineffective at preventing corrosion in such acidic conditions unless added in large amounts. Thus, corrosion is a persistent problem in the production, storage, transportation, and application of AN and UAN solutions. If left untreated, corrosion can lead to several detrimental impacts, including unscheduled plant shutdowns, discoloration and sludge formation, damage to storage tanks and rail cars, increased maintenance and downtime costs, and increased financial and environmental claims.

Amine-based buffering agents, such as ammonia, are typically added to UAN after production to protect equipment and storage/transport vessels. Ammonia itself is not a corrosion inhibitor. However, the ammonia acts to buffer the corrosive effect of the ammonium nitrate, which is the most corrosive component of UAN. As little as 0.01 wt % (100 ppm) to as much as 0.20 wt % (2,000 ppm) excess ammonia may be added as a buffer. Without the addition of this small excess of ammonia, UAN will become extremely acidic, and conventional corrosion inhibitors cannot be applied cost effectively. However, high levels of ammonia can be a safety hazard, and some herbicides and other tank mix products may be sensitive to the presence of ammonia in the solution. Smaller levels of ammonia may not be sufficient to act as a buffer, and corrosion can easily occur once the vessel is emptied, leaving behind a thin UAN film on the vessel wall and residual UAN at the bottom of the vessel (sometimes referred to as a "heel").

Due to this formation of a thin film, surface corrosion occurs on the vertical walls of the vessel. "Surface corrosion" is the typical form of corrosion produced by low ammonia levels and is itself not very damaging to the vessel initially. However, surface corrosion results in the generation of a large amount of corrosion sludge, which winds up on the vessel floor. The sludge can plug spray nozzles in fertilizer application equipment and irrigation booms and contribute to discoloration of the next fertilizer load.

More significantly, sludge formation leads to a corrosion mechanism known as "under-deposit corrosion." The corrosion sludge prevents the normal flow of ions in the solution, resulting in "pockets" of corrosive ions under the sludge. The buildup of corrosion sludge can also prevent corrosion inhibitors from accessing the vessel surface under the sludge. As a result, pits as deep as a quarter inch can form in as little as 5 years.

General remedies used in the past to inhibit AN- or UAN-caused corrosion include high levels (usually hundreds or thousands of mg/kg) of phosphate or polyphosphate salts added directly to the AN or UAN solution to serve as bulk corrosion inhibitors. These remedies fell into disfavor, however, because the phosphates precipitated with other constituents, such as iron, calcium, magnesium, etc. Such precipitates led to unfavorable deposits on the bottom of vessels (as described above), as well as plugging of spray application devices.

Various types of organic film-forming corrosion inhibitors ("filmers"), such as phosphate esters and the like, have also been added to AN and UAN solutions as bulk corrosion inhibitors, but these typically suffer from several problems. Due to filmers' surfactant nature, they may contribute to undesirable foaming during loading or unloading of the fertilizer. Some anti-foam additives can become less effective with time, so the foaming problem can be addressed initially, but may often become problematic before or during application of the fertilizer solution. If the filmer is not well dispersed in the solution, it becomes less effective.

The selection of corrosion inhibitors for liquid fertilizer solutions is made more difficult by the presence of environmental considerations. Since the fertilizer solutions are applied to crops, for example, they must be free of compounds which are toxic to the crops being fertilized, and must also facilitate compliance with industrial hygiene standards for the personnel applying the fertilizer. Thus, fluoride compounds, as one example, are undesirable in UAN solutions because they are generally agrotoxins.

Other corrosion inhibitors that are sometimes used in boilers and cooling towers, such as zinc, are incompatible with the relatively more severely corrosive AN and UAN. Other well-known corrosion inhibitors, such as molybdate and tungstate, do not prevent bloom rust formation (discoloration of a surface finish indicating the early stages of rust) in storage and transport vessels. These "passivating" corrosion inhibitors function by forming insoluble complexes with $Fe^{2+}$ ions as they are generated at the metal surface. These types of corrosion inhibitors are thus not effective at preventing rust/sludge build-up, particularly when large amounts of $Fe^{2+}$ ions are present. These insoluble iron ions can form complexes when brought into contact with acidic AN and UAN solutions and contribute to voluminous sludge formation/deposition and under-deposit corrosion. Furthermore, their performance deteriorates as the pH of the AN or UAN decreases, which occurs as the ammonia volatizes. Molybdate-based corrosion inhibitors also have environmental concerns.

In addition to the above-described bulk corrosion inhibitors directly added to the AN or UAN solution, vessel coatings have also been developed in an attempt to prevent and inhibit corrosion. Such coatings provide a layer on the inner surface of a vessel to prevent contact of the AN or UAN with the inner surface of the vessel. However, the addition of AN or UAN leads to the rapid removal of mineral oil coatings, and rubber or epoxy liners can suffer from cracking or pinhole defects that lead to rapid pitting of any small exposed metal surface. Also, such liners are very often cost prohibitive.

There thus exists a need to provide improved corrosion resistance for storage and transport vessels that carry corrosive substances. In particular, there exists a need to inhibit corrosion on the inner surface of stationary and mobile transport vessels that hold nitrogen-based solutions and other corrosive materials, such as AN or UAN.

SUMMARY

A method is provided for preventing corrosion by a liquid solution of ammonium nitrate or urea ammonium nitrate. The method includes introducing a stannous corrosion inhibitor composition to the liquid solution to provide a treated solution, and contacting the treated solution with a metal surface of a container or conduit.

Also provided is a method of preventing corrosion by a nitrogen-based solution. The method includes combining a corrosion inhibitor composition with the nitrogen-based solution to provide a treated solution, and contacting the treated solution with a metal surface of a container or conduit. The corrosion inhibitor composition includes a stannous salt and a caustic.

Also provided is a method of preventing corrosion in a corrosion-aggressive media. The method includes combining a corrosion inhibitor composition with the corrosion-aggressive media to provide a treated solution. The corrosion inhibitor composition includes a stannous salt and a caustic.

Also provided is a liquid including from 0.1 wt % to 25 wt % of a stannous salt and from 1 wt % to 50 wt % of a caustic.

Also provided is a liquid composition including a solution of ammonium nitrate or a solution of urea ammonium nitrate and a stannous corrosion inhibitor composition.

Many modifications are possible without materially departing from the teachings of the detailed description. Accordingly, such modifications are intended to be included within the scope of the disclosure as defined in the claims.

BRIEF DESCRIPTION OF THE DRAWINGS

Certain embodiments of the disclosure will hereafter be described with reference to the accompanying drawings. It should be understood, however, that the accompanying figures illustrate the various implementations described herein and are not meant to limit the scope of various technologies described herein. The patent or application file contains at least one drawing executed in color. Copies of this patent or patent application publication with color drawing(s) will be provided by the Office upon request and payment of the necessary fee.

DETAILED DESCRIPTION OF EMBODIMENTS

Figure 1:
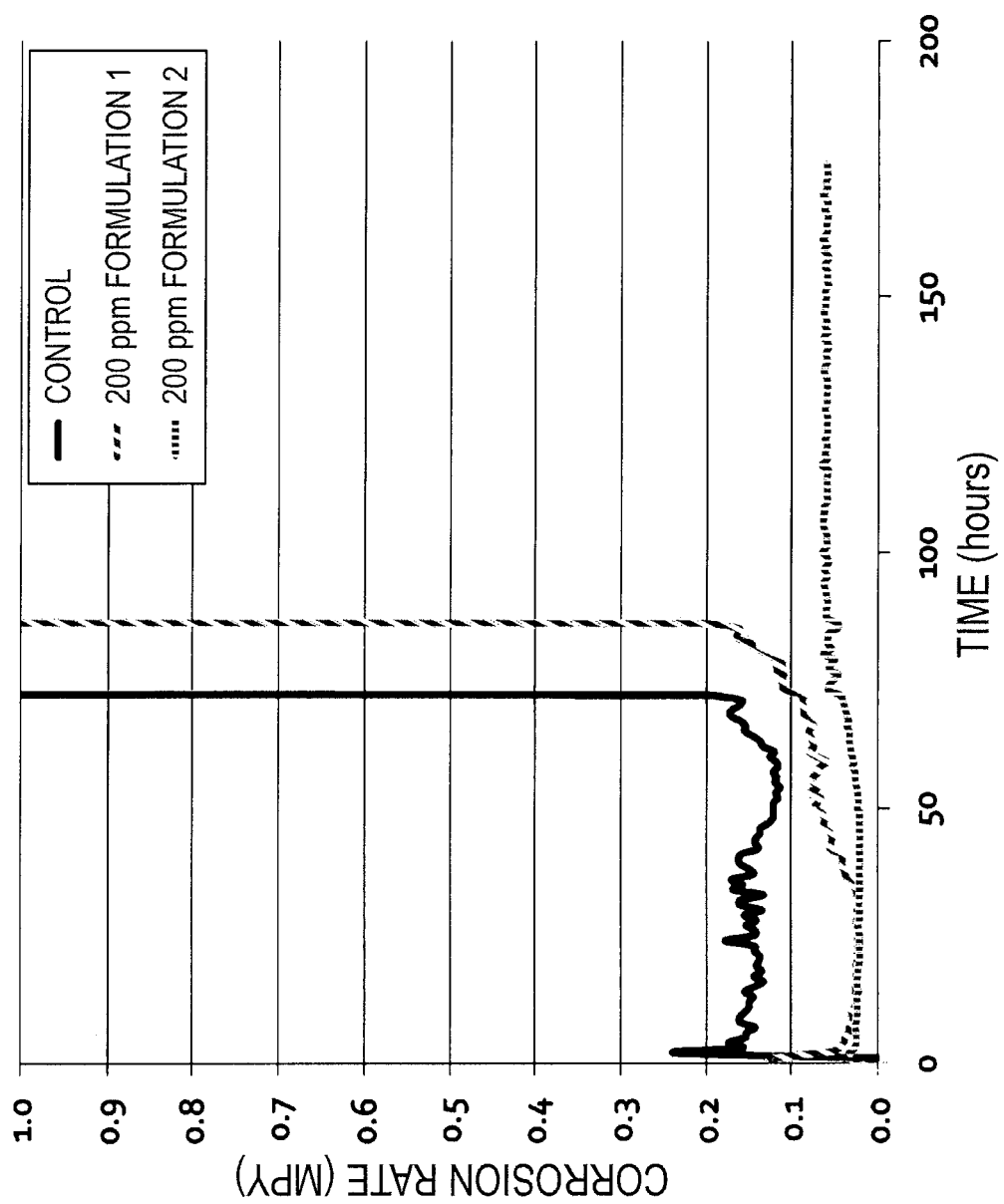
FIG. 1 is a graph showing the corrosion rate of a steel sample in UAN samples either treated or not treated with stannous salt-based formulations according to the Example 1 experiment.

In the summary and this detailed description, it should be understood that a range listed or described as being useful, suitable, or the like, is intended to include support for any conceivable sub-range within the range at least because every point within the range, including the end points, is to be considered as having been stated. For example, "a range of from 1 to 10" is to be read as indicating each possible number along the continuum between about 1 and about 10. Furthermore, one or more of the data points in the present examples may be combined together, or may be combined with one of the data points in the specification to create a range, and thus include each possible value or number within this range. Thus, even if specific data points within the range, or even no data points within the range, are explicitly identified, it is to be understood that the inventors appreciate and understand that any conceivable data point within the range is to be considered to have been specified, and that the inventors possessed knowledge of the entire range and each conceivable point and sub-range within the range.

As described herein, methods are provided for preventing corrosion in a corrosion-aggressive media, and more specifically, for preventing corrosion in a nitrogen-based solution, such as liquid solutions of ammonium nitrate (AN) and urea ammonium nitrate (UAN). The methods include combining a stannous corrosion inhibitor composition with a corrosion-aggressive media (such as a nitrogen-based solution, or more specifically liquid solutions of AN and UAN) to provide a treated solution. Also described is a liquid which may be used as a corrosion inhibitor composition. The liquid includes a stannous salt and a caustic. Additionally described is a liquid composition including a solution of urea ammonium nitrate and a stannous corrosion inhibitor composition. Accordingly, improved methods and compositions for preventing corrosion in a corrosion-aggressive media (such as AN and UAN) are described.

It was surprisingly discovered by the inventors that stannous salts are uniquely well suited for mitigation of corrosion in the presence of aggressive materials. For example, adding even very small amounts of stannous salts to AN or UAN solutions can substantially prevent corrosion of steel. Unlike with molybdate-based passivation treatments, which require larger amounts of corrosion inhibitor, there is no risk of fouling hot surfaces, and there is less risk to the environment. Also, the corrosion performance of stannous-based treatments does not appear to be affected by the pH of the AN or UAN solution, and it remains effective even in very low pH solutions. Thus, the disclosed stannous-based treatments can be implemented with AN and UAN solutions containing only very small amounts of amine-based buffering agents (for example, solutions containing less than 10 ppm, less than 5 ppm, or less than 1 ppm of the buffering agent). In fact, the treatments can be implemented without the addition of any ammonia or other amine-based buffering agents.

Without intending to be bound by theory, it is believed that the addition of stannous salts leads to the formation of a tenacious protective layer on metal surfaces. Stannous ions (Sn (II)) in the AN or UAN solution are drawn to the active metal surfaces that are losing electrons as they oxidize or are forced into solution by electric potentials. The positively charged tin ion is drawn to the negative surfaces, and reduces the oxidized ions (rust and corrosion) and oxidizes itself to stannic Sn(IV) state, which is insoluble. This results in the formation of an inactive layer of Sn(IV) on the metal surface, which protects the metal surface from further corrosion.

Accordingly, disclosed herein is a corrosion inhibitor composition including a stannous salt (a "stannous salt-based composition"). The corrosion inhibitor composition can be an aqueous solution (i.e., a solution containing mostly water). The stannous salt may be, for example, stannous chloride. The amount of stannous salt in the corrosion inhibitor composition can range from 0.1 wt % to 25 wt %, from 1 wt % to 20 wt %, or from 5 wt % to 10 wt %. The amount of tin (from the stannous salt) in the corrosion inhibitor composition can range from 0.05 wt % to 15 wt %, from 0.1 wt % to 10 wt %, or from 1 wt % to 5 wt %.

The corrosion-resistance effects of the corrosion inhibitor composition are substantially more pronounced when a caustic is included together with the stannous salt. As defined herein, a "caustic" is any strongly alkaline substance. Examples of a caustic include, but are not limited to, sodium hydroxide, potassium hydroxide, calcium hydroxide, or ammonium hydroxide. For example, in a 1 N water solution, the caustic may have a pH of 9 or greater, of 11 and greater, or even 13 or greater. The combination of the caustic and stannous salt provides greater corrosion-resistance properties, even at incredibly low pH values and extended periods of time. For example, the combination of stannous salt and caustic can effectively prevent corrosion in a solution having a pH of 6.0 or lower, such as 4.5 and lower, 4.0 and lower, and even 3.0 and lower. The caustic may be included in the corrosion inhibitor composition in an amount ranging from 1 wt % to 50 wt %, from 5 wt % to 30 wt %, or from 10 wt % to 20 wt %.

The corrosion inhibitor composition may include other components in addition to the stannous salt. For example, high efficiency polymers (also known as "advanced polymers") may be added to the corrosion inhibitor composition to enhance the corrosion resistance. As defined herein, a "high efficiency polymer" is any polymer that is effective at dispersing corrosion sludge into solution. The high efficiency polymer prevents the sludge from settling, and therefore prevents under-deposition corrosion. The high efficiency polymer may be included in the corrosion inhibitor composition in an amount ranging from 1 wt % to 40 wt %, from 2.5 wt % to 30 wt %, or from 5 wt % to 15 wt %, for example.

Examples of natural high efficiency polymers include starches, alginates, lignins, tannins, and cellulose derivatives. Examples of synthetic high efficiency polymers include polyacrylates, polymethacrylates, hydrolyzed polyacrylamides, and acrylic acid/acrylamide copolymers. More specifically, one or more of unsaturated carboxylic acid polymers such as polyacrylic acid, homo or co-polymaleic acid (synthesized from solvent and aqueous routes); or acrylate/2-acrylamido-2-methylpropane sulfonic acid (AMPS) copolymers, acrylate/acrylamide copolymers, acrylate homopolymers, terpolymers of carboxylate/sulfonate/maleate, terpolymers of acrylic acid/AMPS, may be added.

The corrosion inhibitor composition may also include phosphate esters such as, but not limited to, polyoxyethylene C8-C10 ether phosphate, tributyl phosphate, or ethylhexyl phosphate; or sulfonated compounds such as, but not limited to, low/medium/high molecular weight alkyl aryl sulfonates. The phosphate ester or sulfonated compound may be included in the corrosion inhibitor composition in an amount ranging from 1 wt % to 40 wt %, from 2.5 wt % to 30 wt %, or from 5 wt % to 15 wt %, for example. These compounds may have a synergistic effect when combined with the stannous salt in the corrosion inhibitor composition.

Additionally, reducing agents may be added to the corrosion inhibitor composition. The reducing agent may be included in the composition in an amount ranging from 0.1 wt % to 10 wt %, from 0.5 wt % to 5 wt %, or from 1 wt % to 3 wt %. It is thought that the reducing agent may help the corrosion inhibitor remain in solution. Example reducing agents include N,N-diethylhydroxylamine (DEHA), erythorbic acid, ascorbic acid, or bisulfite.

Other corrosion inhibitors may be included in the composition in addition to the stannous salt. Additional corrosion inhibitors include phosphonates and phosphinates such as 2-phosphonobutane-1,2,4-tricarboxylic acid (PBTC), 1-hydroxy ethylidene-1,1-diphosphonic acid (HEDP), amino tris methylene phosphonic acid (ATMP), 2-hydroxyphosphonocarboxylic acid (HPA), diethylenetriamine penta (methylene phosphonic acid) (DETPMP), phosphinosuccinic oligomer (PSO); salts of molybdenum and tungsten including, for example, nitrates and nitrites; amines such as diethyl amino ethanol (DEAE), dimethylethanolamine (DMAE), cyclohexylamine, morpholine, monoethanolamine (MEA); and azoles such as tolyltriazole (TTA), benzotriazole (BZT), butylbenzotriazole (BBT), halogenated azoles and their salts.

The corrosion inhibitor composition may be included in the AN or UAN solution as a corrosion inhibitor in an amount ranging from 0.1 ppm to 50,000 ppm, from 0.5 ppm to 5,000 ppm, from 1 ppm to 500 ppm, from 50 ppm to 300 ppm, or from 100 ppm to 200 ppm. The amount of tin (from the stannous salt) in the solution may range from 0.1 ppm to 1,000 ppm, from 0.1 ppm to 500 ppm, from 0.1 ppm to 75 ppm, from 0.5 ppm to 30 ppm, or from 1 ppm to 15 ppm.

EXAMPLES

The following examples are offered in order to more fully illustrate the invention, but are not to be construed as limiting the scope of the invention.

Example 1

In the following example, a mild steel (C1010: 0.10% C) coupon was suspended in a sealed beaker containing either (i) an untreated solution of UAN 32 obtained from a manufacturer (containing about 45 wt % ammonium nitrate, about 35 wt % urea, and about 20 wt % water, as well as excess ammonia), or (ii) a treated solution of UAN 32 obtained by introducing 200 ppm of a stannous salt-based corrosion inhibitor composition (Formulation 1 or Formulation 2 below) to the UAN 32. The steel coupon remained submerged in the UAN solution throughout the course of the study. Air was sparged into the sample to remove the ammonia. The corrosion rate was measured over the course of one week using electrochemical Linear Polarization Resistance (LPR) at 50° C.

The compositions of the salt-based formulations are summarized in Table 1 below.

TABLE 1

Compositions of tested stannous salt-based formulations.

| Formulation 1 | Formulation 2 | Formulation 3 |
|---|---|---|
| 1-5 wt % tin (from stannous chloride) | 1-5 wt % tin (from stannous chloride) | 1-5 wt % tin (from stannous chloride) |
| 5-15 wt % high efficiency polymer | 5-15 wt % high efficiency polymer | 5-15 wt % high efficiency polymer |
| 1-3 wt % reducing agent | 1-3 wt % reducing agent | 10-20 wt % phosphate ester |
| 3-7 wt % citric acid | 10-20 wt % NaOH | 3-7 wt % citric acid |

Although caustic (NaOH) was added to Formulation 2, the solutions containing the corrosion inhibitor compositions had initial pH values similar to the control. Citric acid was added to Formulations 1 and 3 as a chelant to stabilize the formulation.

As shown in FIG. 1, the corrosion rate of the control sample (untreated UAN) containing ammonia averaged about 0.15 MPY. The ammonia was fully removed from the control sample at approximately 70 hours, at which point the pH of the control sample became very acidic: pH 5.45. The decrease in pH lead to a dramatic increase in corrosiveness, as reflected in the spike in corrosion rate once the ammonia was fully removed from the test solution.

The UAN solution containing Formulation 1 exhibited a corrosion rate of only about 0.025 MPY for the first 30 hours, gradually increasing to about 0.15 MPY before the ammonia was fully removed. Thus, the treated sample containing Formulation 1 exhibited a substantial decrease in corrosion rate over time as compared to the control. Once the ammonia was completely removed, the pH of the treated solution lowered to 5.42 and the corrosion rate spiked.

Formulation 2 exhibited a corrosion rate of only 0.025 MPY for even longer than Formulation 1: for the first 50 hours. The corrosion rate gradually increased to a maximum of only about 0.06 MPY. Remarkably, the corrosion rate remained at this rate throughout the course of the study, even after the ammonia was fully removed. This shows that effective corrosion control can be provided for UAN solutions even without adding ammonia to the UAN solution. Furthermore, the final pH of Formulation 2 (4.95) was even lower than that of the control (5.45) and Formulation 1 (5.42). Thus, treatment with both a stannous salt and a caustic (NaOH) provided a significant improvement in corrosion resistance even at a low pH. This suggests that the corrosion-resistance effects of the combinatorial stannous salt/caustic treatment is pH independent, and that the surprising improvement in corrosion rates seen with the added caustic is not due to an increase in the pH of the solution.

Figure 2:
FIG. 2 is a color image illustrating the extent of visible corrosion in UAN samples either treated or not treated with stannous salt-based formulations according to the Example 1 experiment.

As shown in FIG. 2, the effectiveness of the corrosion resistance provided by the stannous salt-based formulations could be visually observed. After one week, the control UAN solution was opaque and had turned a reddish-brown color. By contrast, the stannous salt-based formulations remained transparent. While the UAN solution treated with Formulation exhibited some slight yellow discoloration, the UAN solution treated with Formulation 2 was completely clear. Thus, the impact on corrosion resistance was clearly discernable to the naked eye.

Example 2

In another example, a C1010 coupon was again suspended in a sealed beaker containing a UAN solution, and the extent of corrosion was visually observed and measured via weight loss after one week at 50° C. An untreated UAN 32 solution (pH 5.5) was used as the control sample, and treatment with stannous salt and caustic was tested using a treated sample of the UAN 32 that contained 300 ppm of the above-described Formulation 2.

Figure 3:
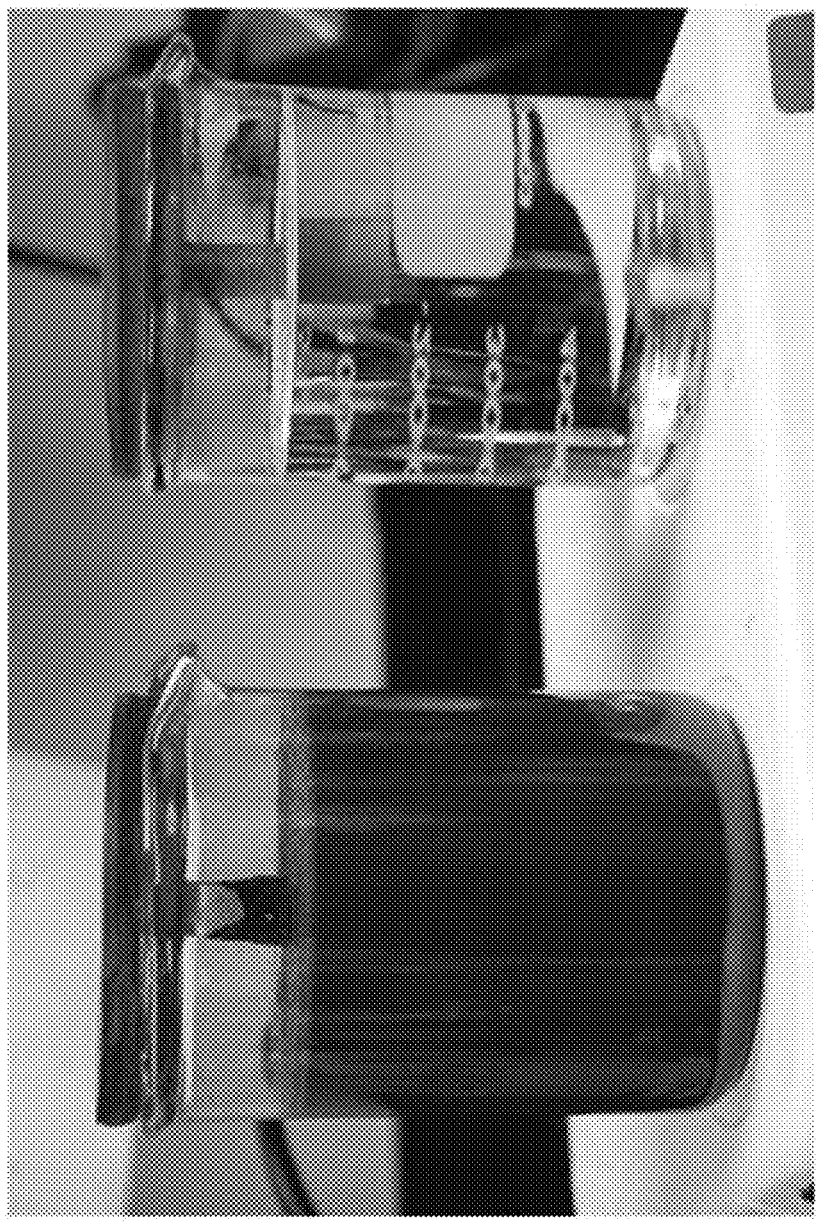
FIG. 3 is a color image illustrating the extent of visible corrosion in UAN samples either treated or not treated with a stannous salt-based formulation according to the Example 2 experiment.
Figure 4:
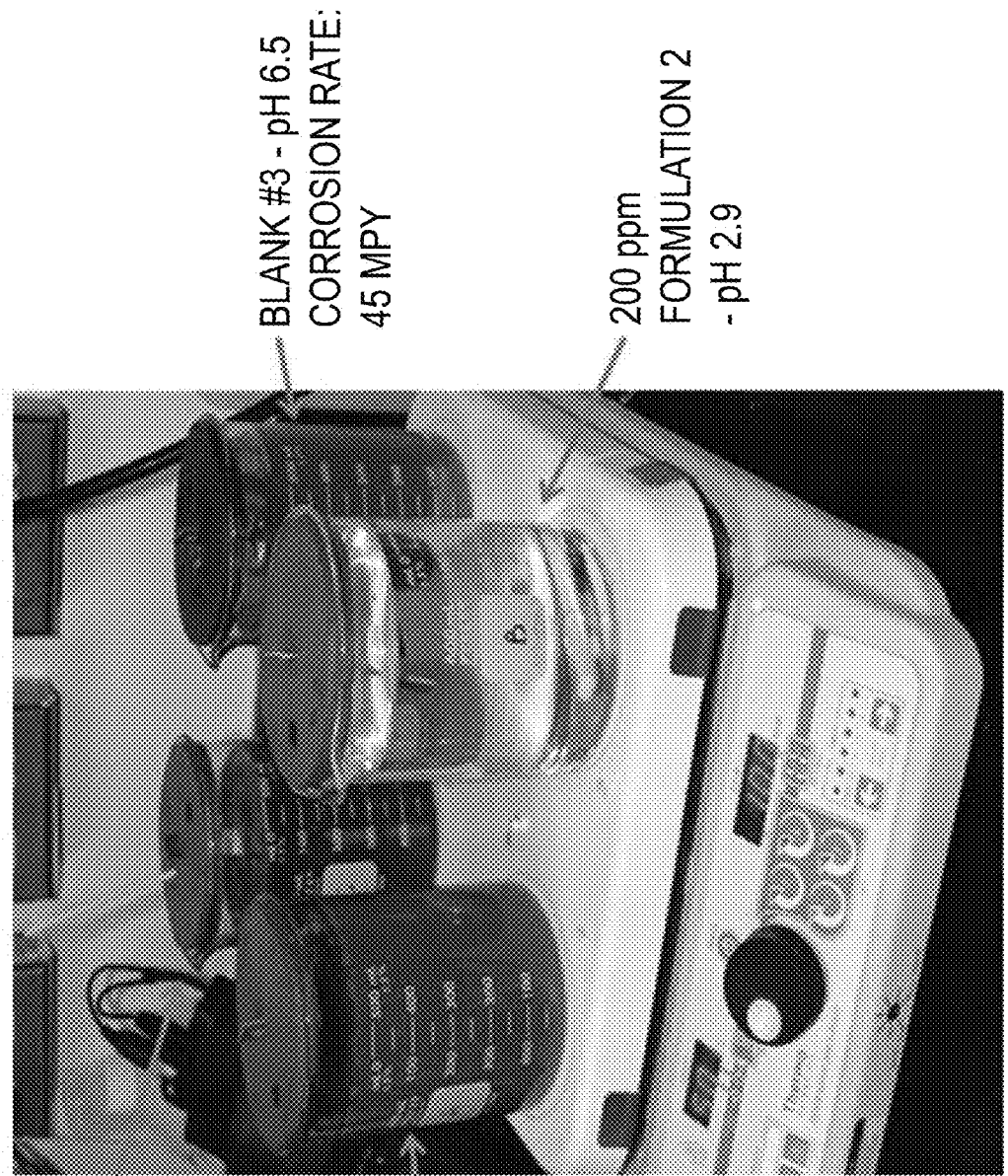
FIG. 4 is a color image illustrating the extent of visible corrosion in various UAN samples, either treated or not treated with a stannous salt-based formulation, at various pH values according to the Example 3 experiment.

As shown in FIG. 3, the control solution appeared opaque and had turned a dark brown color, and measurement by weight loss reflected a corrosion rate of 55 MPY. By contrast, the solution containing Formulation 2 remained clear and exhibited a corrosion rate of only 2.3 MPY, approximately 24 times less than that of the control sample.

Example 3

In a third example, immersion tests were performed over a range of pH values to study the effect of pH on corrosion. Three UAN 32 solutions having different pH values (5.0, 6.0, 6.5) were used as "blank" samples and were compared to a treated UAN 32 solution containing 200 ppm of Formulation 2 (final pH 2.9). A C1010 coupon was again suspended in a sealed beaker containing one of the UAN solutions, and the extent of corrosion was visually observed and measured via weight loss after one week at 50° C.

By the end of the week, all three blank samples had turned dark brown and appeared opaque. The corrosion rate of the blank samples increased dramatically from 44 MPY to 56 MPY below a pH of 6.0. There was no significant change in corrosion rate above a pH of 6.5. The corrosion rates of the blank samples are summarized in Table 2 below.

TABLE 2

Corrosion rates as a function of pH.

| Sample | pH | Corrosion Rate (MPY) |
|---|---|---|
| Blank #1 | 5.0 | 56 |
| Blank #2 | 6.0 | 44 |
| Blank #3 | 6.5 | 45 |

By contrast, the solution containing Formulation 2 remained clear, even at an extremely low pH of only 2.9. These results demonstrate the remarkable increase in corrosion resistance achieved by treating the UAN solution with a combination of a stannous salt and a caustic. These corrosion results are very surprising because one of ordinary skill in the art would not have expected a corrosion inhibitor to be effective at such a low pH, particularly in such a small amount. Traditional corrosion inhibitors are typically rendered ineffective at a pH of lower than 6.0, requiring a buffering agent such as ammonia to be added to the acidic UAN solution. Here, the combination of stannous salt and caustic successfully inhibited corrosion at a pH of only 2.9 when no ammonia was present. This was achieved even though only 200 ppm of the corrosion inhibitor (containing 1-5 wt % tin and 10-20 wt % NaOH) was added to the UAN solution.

Example 4

In another example, a C1010 coupon was suspended in a sealed beaker containing a 20% ammonium nitrate (AN) solution, and the extent of corrosion was visually observed after three days at 50° C. Untreated AN 20 (pH 7.0) was used as the control sample, and treatment with stannous salt was tested using treated samples of the AN 20 that contained varying amounts of the above-described Formulation 3 (100 ppm, 150 ppm, 250 ppm).

Figure 5:
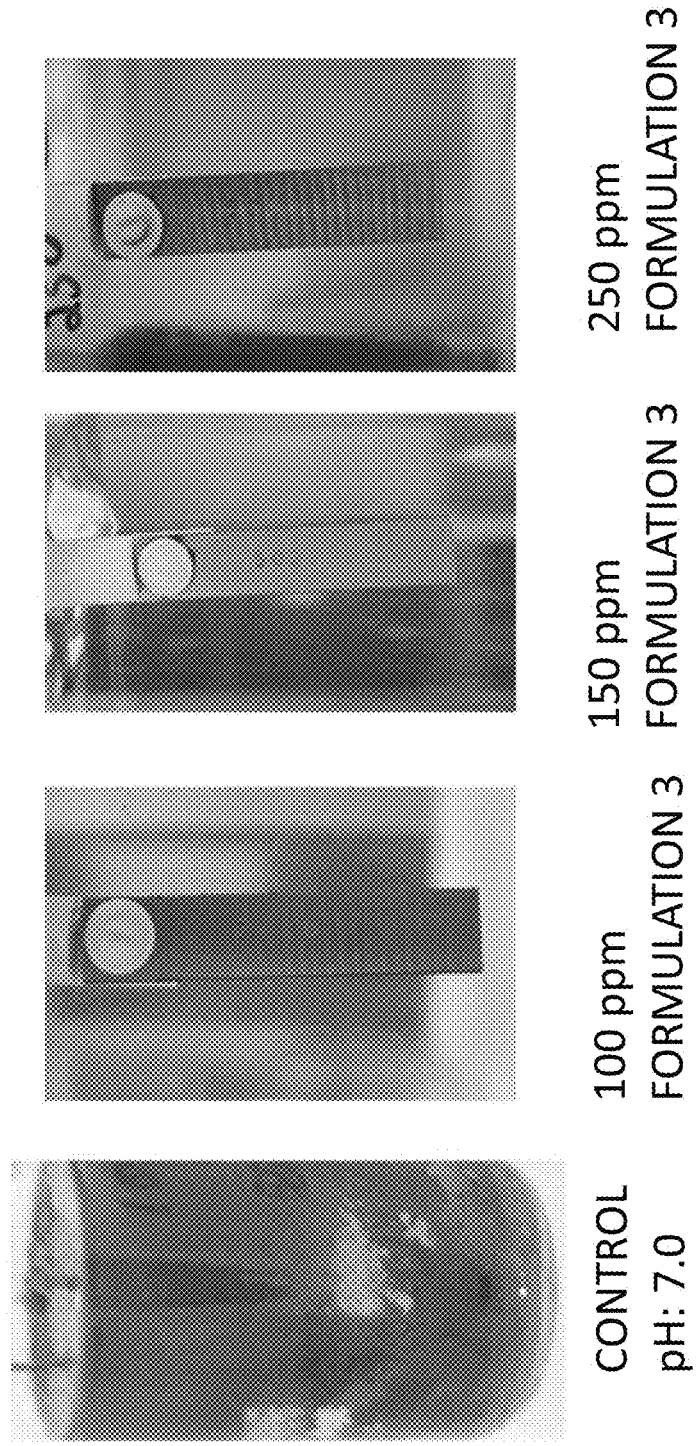
FIG. 5 is a color image illustrating the extent of visible corrosion in an AN sample treated with a stannous salt-based formulation according to the Example 4 experiment.

As shown in FIG. 5, the control solution had turned a reddish-brown color after only 3 days, and brown and black deposits were observed on the interior surface of the beaker. By contrast, the solutions containing Formulation 3 remained clear when as little as 100 ppm of the formulation was added.

Although only a few example embodiments have been described in detail above, those skilled in the art will readily appreciate that many modifications are possible in the example embodiments without materially departing from the disclosed methods for maintaining unpaved roads. Accordingly, all such modifications are intended to be included within the scope of this disclosure as defined in the following claims.

What is claimed is:

1. A method of preventing corrosion by a liquid solution of ammonium nitrate or urea ammonium nitrate, the method comprising:
    combining a stannous corrosion inhibitor composition with the liquid solution to provide a treated solution; and
    contacting the treated solution with a metal surface of a container or conduit, wherein the treated solution has a pH of 6.0 or lower.

2. The method of claim 1, wherein the liquid solution contains 50 wt % or less of water.

3. The method of claim 1, wherein the treated solution comprises from 1 ppm to 500 ppm of the stannous corrosion inhibitor composition.

4. The method of claim 1, wherein the treated solution comprises from 0.1 ppm to 75 ppm tin.

5. The method of claim 4, wherein the treated solution comprises from 1 ppm to 15 ppm tin.

6. The method of claim 1, wherein the stannous corrosion inhibitor composition includes stannous chloride.

7. The method of claim 1, wherein the stannous corrosion inhibitor composition comprises a caustic.

8. The method of claim 7, wherein the stannous corrosion inhibitor composition comprises from 5 wt % to 30 wt % of the caustic.

9. The method of claim 7, wherein the caustic is sodium hydroxide.

10. The method of claim 7, wherein the treated solution contains less than 10 ppm of an amine-based buffering agent.

11. The method of claim 7, wherein the liquid solution does not contain ammonia.

12. The method of claim 1, wherein the metal surface is formed of mild steel.

13. The method of claim 1, wherein the treated solution has a pH of 4.5 or lower.

14. The method of claim 1, wherein the treated solution has a pH of 4.0 or lower.

15. The method of claim 1, wherein the treated solution has a pH of 3.0 or lower.

16. A method of preventing corrosion by a nitrogen-based fertilizer solution, the method comprising:
    combining a corrosion inhibitor composition with the nitrogen-based fertilizer solution to provide a treated solution, the corrosion inhibitor composition comprising a stannous salt and a caustic; and
    contacting the treated solution with a metal surface of a container or conduit, wherein the treated solution has a pH of 6.0 or lower.

17. The method of claim 16, wherein the nitrogen-based fertilizer solution contains from 15% to 40% nitrogen.

18. A method of preventing corrosion in a nitrogen-based solution, the method comprising:
  combining a corrosion inhibitor composition with the nitrogen-based solution to provide a treated solution, the corrosion inhibitor composition comprising a stannous salt and a caustic; and
  contacting the treated solution with a metal surface of a container or conduit, wherein the treated solution has a pH of 6.0 or lower.

19. The method of claim 18, wherein the treated solution has a pH of 4.5 or lower.

20. The method of claim 18, wherein the treated solution has a pH of 4.0 or lower.

21. The method of claim 18, wherein the treated solution has a pH of 3.0 or lower.

* * * * *